US009868488B2

(12) United States Patent
Hackl

(10) Patent No.: US 9,868,488 B2
(45) Date of Patent: Jan. 16, 2018

(54) ASSEMBLY FOR ADJUSTING RAKE ANGLE AND TRAIL ON A MOTORCYCLE

(71) Applicant: 14th Century Renaissance LLC, Oshkosh, WI (US)

(72) Inventor: Bradley A. Hackl, Oshkosh, WI (US)

(73) Assignee: Bradley A. Hackl, Watertown, WI (US)

( * ) Notice: Subject to any disclaimer, the term of this patent is extended or adjusted under 35 U.S.C. 154(b) by 124 days.

(21) Appl. No.: 14/676,077

(22) Filed: Apr. 1, 2015

(65) Prior Publication Data

US 2016/0288863 A1    Oct. 6, 2016

(51) Int. Cl.
*B62K 19/32* (2006.01)
*B62K 21/02* (2006.01)
*B62K 21/22* (2006.01)
*B62K 19/16* (2006.01)
*B62K 25/02* (2006.01)

(52) U.S. Cl.
CPC ............. *B62K 21/22* (2013.01); *B62K 19/32* (2013.01); *B62K 21/02* (2013.01); *B62K 19/16* (2013.01); *B62K 25/02* (2013.01)

(58) Field of Classification Search
CPC ........ B62K 19/16; B62K 19/32; B62K 21/02; B62K 21/22; B62K 25/02
See application file for complete search history.

(56) References Cited

U.S. PATENT DOCUMENTS

| 581,842 | A | * | 5/1897 | Beecher | ................. B62K 25/02 280/288 |
| 1,995,794 | A | * | 3/1935 | Clark | ..................... B62K 25/02 280/286 |

(Continued)

FOREIGN PATENT DOCUMENTS

| DE | 9104109 U1 | * | 7/1992 | ............. B62K 25/02 |
| DE | 19847025 A1 | * | 4/2000 | ............. B62K 21/02 |
| DE | 102009038485 A1 | * | 4/2011 | ............. B62K 25/02 |

*Primary Examiner* — Joseph M Rocca
*Assistant Examiner* — Maurice L Williams
(74) *Attorney, Agent, or Firm* — Thomas J. Connelly; Northwind IP Law, S.C.

(57) ABSTRACT

An assembly for a motorcycle is disclosed which can adjust rake angle and trail on a motorcycle. The assembly includes an inner housing which engages with an outer housing. The outer housing attaches to the frame of a motorcycle and has a first aperture and at least two additional apertures. The inner housing has a pair of angled apertures formed therethrough, a first aperture aligned with the first aperture formed in the outer housing, and at least two additional apertures each of which is capable of being aligned with one of the at least two additional apertures formed in the outer housing. First and second attachment members join the inner housing to the outer housing at a predetermined angle. The assembly also includes a pair of forks capable of supporting an axle on which a front wheel is mounted. Each of the pair of forks has a first end which passes through one of the pair of angled apertures formed in the inner housing. The pair of angled apertures establishes the rake angle for the motorcycle. The assembly further includes a pair of brackets each secured adjacent to a second end of each of the pair of forks. Each of the pair of brackets has at least two spaced apart grooves formed therein for receiving the axle.

20 Claims, 4 Drawing Sheets

(56) References Cited

U.S. PATENT DOCUMENTS

| | | | | |
|---|---|---|---|---|
| 4,565,383 A * | 1/1986 | Isaac | ............ | B62K 19/30 |
| | | | | 228/154 |
| 4,565,384 A | 1/1986 | Dehnisch | | |
| 4,624,470 A * | 11/1986 | Love | ............ | B62K 21/00 |
| | | | | 180/219 |
| 5,326,157 A * | 7/1994 | Nagano | ............ | B62K 25/02 |
| | | | | 301/110.5 |
| 5,967,538 A | 10/1999 | Callaluca et al. | | |
| 6,176,503 B1 | 1/2001 | George | | |
| 7,357,403 B2 | 4/2008 | Vincenzo F. | | |
| 7,546,894 B1 * | 6/2009 | Glenn | ............ | B62K 19/32 |
| | | | | 180/227 |
| 2005/0151346 A1 * | 7/2005 | James | ............ | B62K 25/02 |
| | | | | 280/288 |
| 2006/0022427 A1 * | 2/2006 | Grant | ............ | B62K 13/00 |
| | | | | 280/279 |
| 2006/0060405 A1 * | 3/2006 | Pender | ............ | B62K 19/32 |
| | | | | 180/219 |
| 2007/0004488 A1 * | 1/2007 | Kirila | ............ | G09B 9/058 |
| | | | | 463/11 |
| 2007/0069498 A1 * | 3/2007 | Raddin | ............ | B62K 25/02 |
| | | | | 280/279 |
| 2008/0202827 A1 * | 8/2008 | Thiers | ............ | B60G 3/14 |
| | | | | 180/6.24 |
| 2009/0152042 A1 * | 6/2009 | Pierick | ............ | B62K 3/04 |
| | | | | 180/311 |

* cited by examiner

ASSEMBLY FOR ADJUSTING RAKE ANGLE AND TRAIL ON A MOTORCYCLE

FIELD OF THE INVENTION

The present invention relates to an assembly for adjusting rake angle and trail on a motorcycle.

BACKGROUND OF THE INVENTION

All motorcycles have a steering housing, generically referred to as a "tree", and a pair of forks which support an axle on which a front wheel is mounted. The structure of the "tree" and the angle of the pair of forks can vary. An important consideration in the design of a motorcycle is the "rake angle" exhibited by the pair of front forks and the degree of "trail". The term "rake angle" refers to the slant or incline at which the pair of forks intersects the ground. The term "trail" refers to the horizontal distance between a point where a vertical axis passing through the front wheel perpendicularly intersects the ground and a point where the steering axis of the motorcycle intersects the ground. Since the steering axis is rearward or behind the vertical axis, this horizontal distance is referred to as "trail".

In order to change the riding characteristics of a motorcycle, the rake angle and the amount of trail can be changed. As one changes the rake angle, the trail will also change. If the "trail" is too large, the motorcycle may be stable at high speed but will be hard to handle at low speeds and in curves. If, on the other hand, the "trail" is too small, the motorcycle may be easy to steer at low speeds but will have no self steering at high speeds, and may wobble.

In the United States, minimum and maximum "rake angles" and trail dimensions are set by law which motorcycle manufacturers must adhere to. For the safe operation of a motorcycle, the "rake angle" is usually set from between about 20 degrees to about 45 degrees. These "rake angles" would provide a "trail" of between about 2 inches to 14 inches. Most motorcycle manufacturers recommend a "trail" of from between about 3 inches to about 6 inches.

Some motorcycle enthusiasts like to be able to adjust their motorcycle ride. Up until now, this has been virtuously impossible without spending a considerable amount of money to have a custom motorcycle shop chop the front end of their motorcycle to create a different rake angle. This does provide the motorcycle with a different ride but the owner is again stuck with only one rake angle for that particular motorcycle. It would be nice to employ an assembly that would allow a quick and easy adjustment in rake angle and trail settings while providing the motorcycle owner with the ability to return to the original trail setting, if desired.

Now, an assembly has been invented for adjusting rake angle and trail on a motorcycle.

SUMMARY OF THE INVENTION

Briefly, this invention relates to an assembly for adjusting rake angle and trail on a motorcycle. The assembly includes an outer housing having an attachment for pivotably securing the outer housing to a motorcycle frame. The outer housing also has a first aperture and at least two additional apertures. The assembly also includes an inner housing which engages the outer housing. The inner housing has a pair of angled apertures formed therethrough, a first aperture aligned with the first aperture formed in the outer housing, and at least two additional apertures, each of which is capable of being aligned with one of the at least two additional apertures formed in the outer housing. The assembly further includes a first attachment member which passes through the first apertures formed through both the outer housing and the inner housing for securing the inner housing to the outer housing. The assembly further includes a second attachment member which passes through one of the at least two additional apertures formed through both the outer housing and the inner housing for securing the inner housing at a predetermined angle to the outer housing. The assembly also includes a pair of forks capable of supporting an axle on which a front wheel is mounted. Each of the pair of forks has a first end and a second end. Each of the first ends passes through one of the pair of angled apertures formed in the inner housing. The pair of angled apertures establishes the rake angle for the pair of forks. Lastly, the assembly includes a pair of brackets each secured adjacent to the second end of each of the pair of forks. Each of the pair of brackets has at least two spaced apart grooves formed therein for receiving the axle, whereby one can adjust the rake angle and trail on the motorcycle by adjusting the position of the inner housing to the outer housing and by positioning the axle across the pair of brackets using a different pair of the spaced apart grooves.

In another embodiment, the outer housing of the assembly has a longitudinal central axis, a vertical central axis and a transverse central axis. The outer housing also has an attachment for pivotably securing the outer housing to a motorcycle frame. In addition, the outer housing has a first aperture aligned along the longitudinal central axis and at least two additional apertures aligned along the longitudinal central axis. The remaining elements of the assembly are the same as described above.

In a third embodiment, the outer housing of the assembly has an enlarged aperture formed therethrough which is sized to receive a post, known as a neck or a gooseneck. The neck or gooseneck is secured to the frame of the motorcycle. The outer housing also has a first aperture and at least two additional apertures. The remaining elements of the assembly are the same as described above.

The general object of this invention is to provide an assembly for adjusting rake angle and trail on a motorcycle. A more specific object of this invention is to provide a variable housing assembly and a fork bracket assembly that allows for easy adjustment of the trail on a motorcycle.

Another object of this invention is to provide an assembly that can be secured to various makes of motorcycles.

A further object of this invention is to provide an assembly which allows a motorcycle owner to adjust his ride by setting the rake angle and trail without having to physically chop his motorcycle.

Still another object of this invention is to provide an assembly which provides a quick and easy way to adjust the rake angle and trail on a motorcycle.

Still further, an object of this invention is to provide an assembly that is relatively inexpensive to purchase.

Other objects and advantages of the present invention will become more apparent to those skilled in the art in view of the following description and the accompanying drawings.

DETAILED DESCRIPTION OF THE INVENTION

Figure 1:
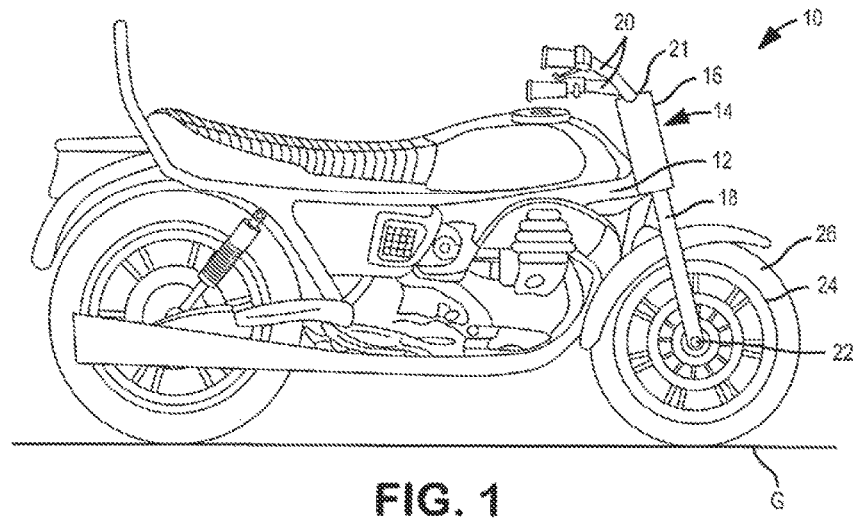
FIG. 1 is a side view of a motorcycle having a fork assembly supporting an axle on which a front wheel is mounted.

Referring to FIG. 1, a motorcycle 10 is shown. By "motorcycle" it is meant a two wheel vehicle resembling a heavy bicycle. The motorcycle 10 has a frame 12 to which is connected a front end 14. The front end 14 includes a steering housing 16 through which a pair of front forks 18, 18 extends. One of the pair of forks 18, 18 is shown in FIG. 1. A handlebar 20 or a pair of handlebars 20, 20 is secured to the upper end of the steering housing 16 via one or more brackets 21. A front axle 22 is secured to the lower ends of the pair of forks 18, 18. The front axle 22 is aligned horizontal to the ground and supports a wheel 24. A tire 26 is mounted to the wheel 24. The wheel 24 can vary in size, diameter, construction and material from which it is made. The materials from which the wheel 24 can be constructed can vary. Typically, the wheel 24 is made from aluminum, an aluminum alloy, steel or some other kind of metal alloy. Likewise, the tire 26 can vary in size, diameter, thickness, thread design, internal configuration, material from which it is formed, etc. Usually the tire 26 is made from rubber which can be optionally reinforced with steel wires. The tire 26 can be a solid tire or include an inner tube (not shown) which is designed to hold pressurized air. Alternatively, the tire 26 can be a tubeless tire.

Figure 11:
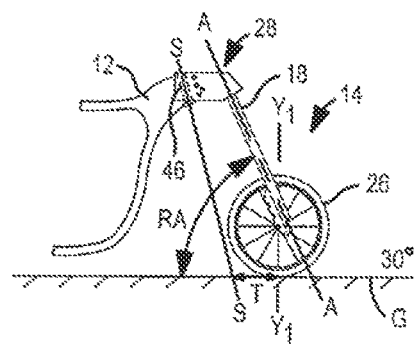
FIG. 11 is a side view of the front of a motorcycle showing a rake angle of 30° and a small trail dimension.

Referring to FIG. 11, when an owner of a motorcycle 10 desires to change the ride characteristics of his or her motorcycle 10, he or she has to mechanically alter the front end by changing the "rake angle" and "trail" of the motorcycle 10. By "rake angle" it is meant the angle at which the pair of forks 18, 18 intersect the ground G. By "trail" it is meant the horizontal distance between a point at which the steering axis S-S of the motorcycle 10 intersects the ground G and a point where a vertical axis $Y_1$-$Y_1$ passing through the center of the front wheel 24 perpendicularly intersects the ground. Since the steering axis S-S trails or is located rearward of the vertical axis passing through the front wheel 24, the term "trail" is used to describe this dimension. The complexity involved in making this change usually causes most motorcycle owners to hire a custom motorcycle shop to make this change. This change is costly and time consuming. Once the ride characteristics of a motorcycle 10 have been changed, the motorcycle 10 will exhibit a different ride, for example a smoother ride, a firmer ride, etc. The owner of the motorcycle 10 cannot return the motorcycle 10 to its original ride characteristics without again permanently mechanically changing the setup of the front end 12.

In order to solve this problem, a variable housing and fork bracket assembly 28 has been invented that allows the rake angle and trail (trail dimension) on a motorcycle 10 to be easily and quickly changed. This change can be performed by the owner of motorcycle 10 with limited mechanical ability and with standard tools.

Referring to FIGS. 2-7, the variable housing and fork bracket assembly 28 includes an outer housing 30. The outer housing 30 has a longitudinal central axis X-X, a vertical central axis Y-Y and a transverse central axis Z-Z, see FIG. 6. The outer housing 30 can be formed from a variety of material. Such materials include but are not limited to: steel, high carbon steel, metal, a metal alloy, titanium, a titanium alloy, polycarbonate or a strong composite material. The outer housing 30 can also be chrome plated, if desired. The outer housing 30 can vary in size, shape and configuration. As depicted, the outer housing 30 has a general C-shaped configuration which includes a first member 32 having first and second ends, 34 and 36 respectively. A first side 38 is secured to the first end 34 of the first member 32 and a second side 40 is secured to the second end 36 of the first member 32. This arrangement provides the generally C-shaped configuration. The dimensions of the outer housing 30, such as its length, width and thickness can vary to accommodate different size and models of motorcycles 10. Alternatively, the outer housing 30 can be formed as an integral unit.

Figure 4:
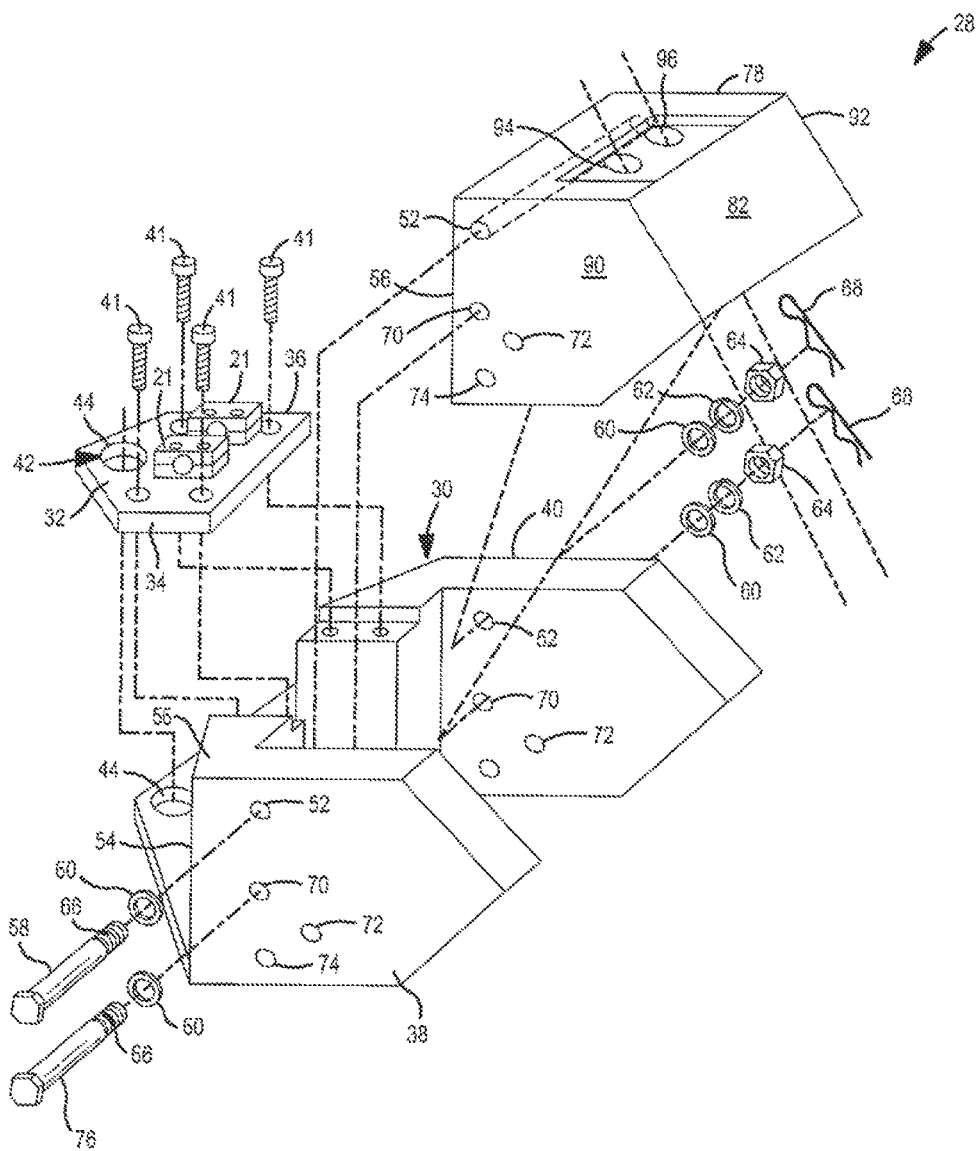
FIG. 4 is an exploded view of a steering housing.

It should be understood that when the outer housing 30 is formed from individual pieces, the first member 32 and the first and second sides, 38 and 40 respectively, can be secured together by any means known to those skilled in the art. For example, such securement can include but is not limited to mechanically fasteners, such as screws, machine screws, bolts, washers, lock washers, nuts, etc., welding, bonding, mechanically affixing with pins, dowel rod, clips, key and groove construction, adhesive, etc. Four machine screws 41, 41, 41 and 41 are depicted in FIG. 4 which join the first member 32 to the first and second sides, 38 and 40 respectively.

Figure 5:
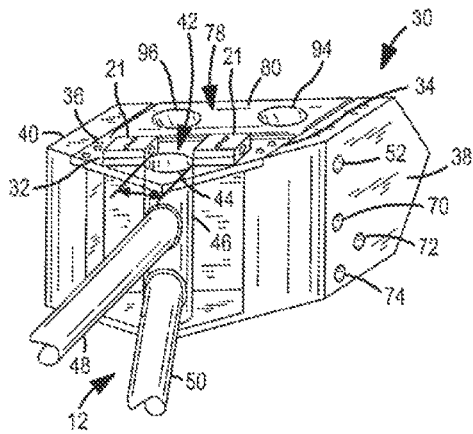
FIG. 5 is a rear view of the steering housing connected to the frame of a motorcycle.
Figure 6:
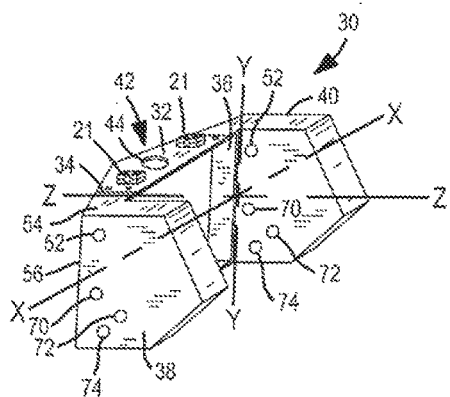
FIG. 6 is a perspective view of an outer housing.

Referring now to FIGS. 5 and 6, the outer housing 30 also includes an attachment mechanism 42 for pivotably securing the outer housing 30 to the frame 12 of the motorcycle 10. The attachment mechanism 42 can vary in shape, size and configuration. For simplicity sake only, the attachment mechanism 42 is depicted as an enlarged aperture 44 formed through the first member 32. The enlarged aperture 44 is designed to receive a post 46, see FIG. 5, which is commonly referred to as a neck or a gooseneck. The post 46 is secured to the frame 12 of the motorcycle 10. The enlarged aperture 44 can pivot on the post 46 through a set number of degrees. The enlarged aperture 44 can be vertically aligned relative to the post 46 or be at an angle thereto. In FIG. 5, the frame 12 is depicted as including the post 46 and has first and second tubular members, 48 and 50 respectively, secured thereto. Other frame structures can also be utilized.

Still referring to FIG. 5, the enlarged aperture 44 has a diameter d which can vary in dimension. The diameter d of the enlarged aperture 44 can range from between about 1 inch to about 3 inches. Desirably, the diameter d of the enlarged aperture 44 can range from between about 1.25 inches to about 2.5 inches. More desirably, the diameter d of the enlarged aperture 44 can range from between about 1.5 inches to about 2 inches. Even more desirably, the diameter d of the enlarged aperture 44 is about 1.6 inches or more.

Figure 2:
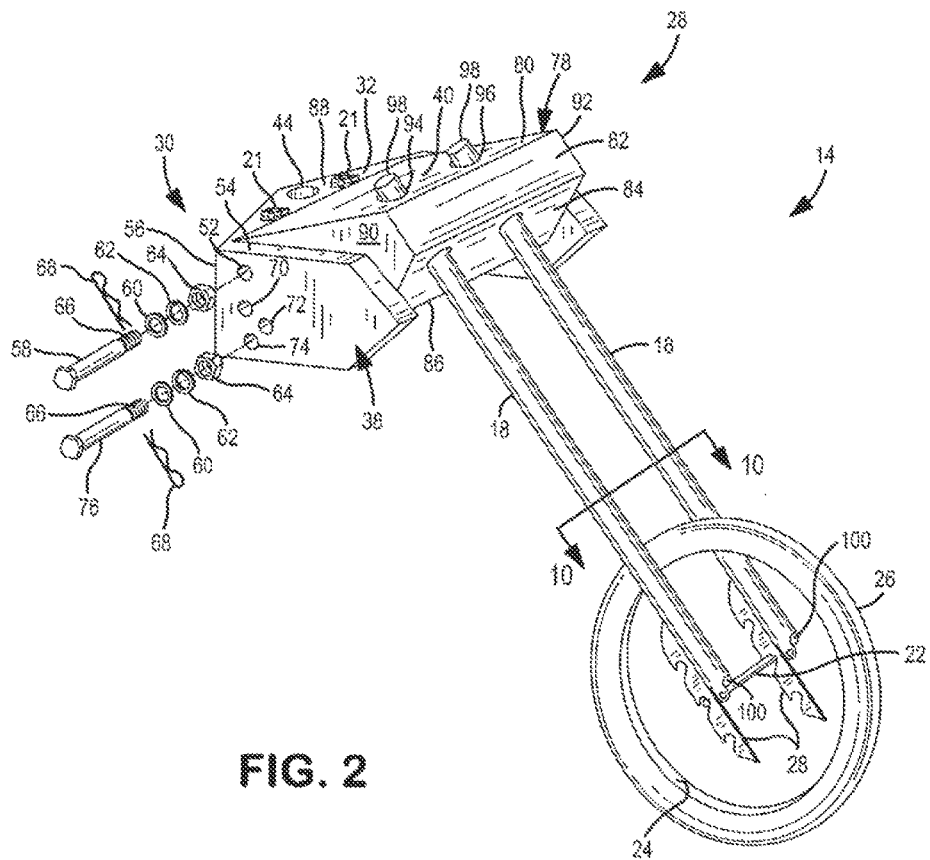
FIG. 2 is a perspective view of an assembly that attaches to the frame of a motorcycle and has a rake angle of 34°.

Referring again to FIGS. 2 and 6, the outer housing 30 also includes a first aperture 52 which is formed through the first and second sides, 38 and 40 respectively. The first aperture 52 is aligned along the longitudinal central axis X-X of the outer housing 30. The diameter of the first aperture 52 can vary. The diameter of the first aperture 52 can range from between about 0.25 inches to about 0.75 inches. Desirably, the diameter of the first aperture 52 is about 0.5 inches. The exact location of the first aperture 52 can vary. In FIG. 2, the first and second sides, 38 and 40 respectively, are identical in size and shape. The first side member 38 has a top surface 54 and a back edge 56. The center of the first aperture 52 can be located about 1 inch down from the top surface 54 and about 0.75 inches in from the back edge 56. The first aperture 52 is sized to receive a first attachment member 58. The first attachment member 58 can vary in size, shape and structure. The first attachment member 58 is depicted as an elongated threaded bolt that can vary in diameter and length. The first attachment member 58 can have a diameter of about 0.5 inches. The first attachment member 58 can vary in length. The first attachment member 58 can have a length of about 10 inches. It should be understood that if the first and second sides, 38 and 40 respectively, are spaced a lesser or a greater distance apart, then the length of the first attachment member 58 will need to be adjusted accordingly.

When the first attachment member 58 is a threaded bolt, the threads on the bolt can vary. One skilled in mechanical fasteners will be able to select a thread appropriate for this application. The first attachment member 58 is designed to pass through the first apertures 52, 52 formed in the first and second sides, 38 and 40 respectively. One or more washers can be utilized. A flat washer 60 can optionally be positioned adjacent to the head of the first attachment member 58. A flat washer 60, a lock washer 62 and a nut 64 can be secured to the free end of the first attachment member (threaded bolt) 58 once it has passed through the apertures 52 formed in the second side 40. A pin hole 66 is formed through the first attachment member (threaded bolt) 58 about 3 millimeters (mm) from its free end. The size of the pin hole 66 can vary. Desirably, the pin hole 66 has a diameter of less than about 0.2 inches. More desirably, the pin hole 66 has a diameter of less than about 0.15 inches. Even more desirably, the pin hole 66 has a diameter of about 0.1 inches. The pin hole 66 is designed to receive a cotter pin 68. By "cotter pin" it is meant a split cotter designed to be inserted through a hole and bent at its ends to fasten two pieces together. The cotter pin 68 will ensure that the nut 64 will not come loose from the first attachment member (threaded bolt) 58.

Figure 3:
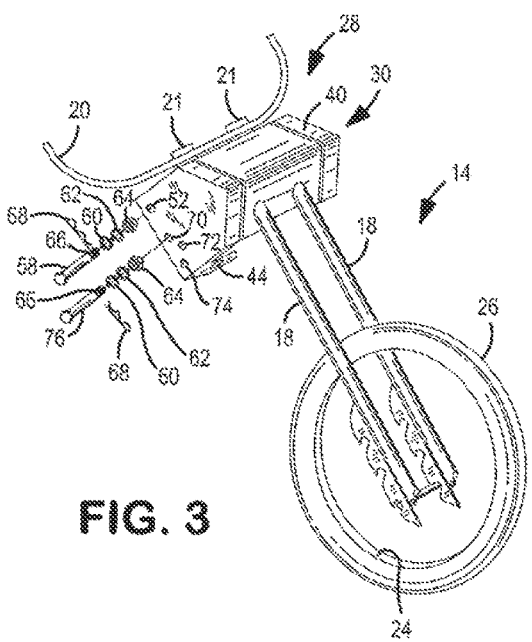
FIG. 3 is a perspective view of an assembly that attaches to the frame of a motorcycle and has a rake angle of 30°.

It should be understood that the number of washers, the kinds of washers, the kind of nut, etc. can vary and one skilled in the art will understand what is best for a particular situation in order to obtain an adequate fastener. FIGS. 2 and 3 show two washers 60 and 62 while FIG. 4 shows three washers. 60, 60 and 62.

Still referring to FIGS. 2 and 6, the outer housing 30 also contains at least two additional apertures, 70 and 72. Three additional apertures 70, 72 and 74 are shown which are hereinafter referred to as a second aperture 70, a third aperture 72 and a fourth aperture 74. It should be understood that one could form two, three, four, five, or more additional apertures if one desired to do so in the outer housing 30 provided enough space was available. The second, third and fourth apertures, 70, 72 and 74 respectively, are formed through the first and second sides, 38 and 40 respectively.

All three of the additional apertures 70, 72 and 74 are aligned along the longitudinal central axis X-X of the outer housing 30. The exact location of the three additional apertures 70, 72 and 74 can vary depending upon the rake angle one desires to establish in the assembly 28. As depicted, the second aperture 70 is located to provide a 30° rake angle, the third aperture 72 is located to provide a 38° rake angle, and the fourth aperture 74 is located to provide a 34° rake angle. In other words, each of the additional apertures 70, 72 and 74 will correspond to a particular rake angle depending on its location in the first and second sides, 38 and 40 respectively.

It should also be understood that one could construct the variable housing and fork bracket assembly 28 to have a plurality of additional apertures, each of which will provide a specific rake angle. For example, one could construct the variable housing and fork bracket assembly 28 to provide three different rake angles, of say 28°, 31° and 34°, or four different rake angles, of say 28°, 30°, 32° and 34°.

Each of the second, third and fourth apertures, 70, 72 and 74 respectively, has a diameter of from between about 0.25 inches to about 0.75 inches. Desirably, each of the second, third and fourth apertures, 70, 72 and 74 respectively, has a diameter of about 0.5 inches. The diameter of each of the second, third and fourth apertures, 70, 72 and 74 respectively, should be similar or identical to the diameter of the first aperture 52. Desirably, the diameters of the second, third and fourth apertures, 70, 72 and 74 respectively, are all of the same size and all the diameters are identical to the diameter of the first aperture 52.

Still referring to FIGS. 2 and 6, each of the second, third and fourth apertures, 70, 72 and 74 respectively, is sized to alternately receive a second attachment member 76. The second attachment member 76 can vary in size, shape and structure. Desirably, the second attachment member 76 is identical in size, shape and structure to the first attachment member 58. The second attachment member 76 is depicted as an elongated threaded bolt that can vary in diameter and length. The second attachment member 76 can have a diameter of about 0.5 inches. The second attachment member 76 can have a length equal to the first attachment member 58. For example, the second attachment member 76 can have a length of about 10 inches. It should be understood that if the first and second sides, 38 and 40 respectively, are spaced a lesser or a greater distance apart, then the length of the second attachment member 76 will need to be adjusted accordingly.

The location of the center of each of the second, third and fourth apertures, 70, 72 and 74 respectively, can vary to provide a desired rake angle. The second, third and fourth apertures, 70, 72 and 74 respectively, are shown positioned to provide rake angles of 30°, 38° and 34° respectively. For these rake angles, the second aperture 70 is located about 3.2 inches down from the top surface 54 and about 2.8 inches in from the back edge 56 of the first side 38. The third aperture 72 is located about 4.6 inches down from the top surface 54 and about 3.2 inches in from the back edge 56 of the first side 38. The fourth side member 74 is located about 5.4 inches down from the top surface 54 and about 3 inches in from the back edge 56 of the first side 38. The locations of the second, third and fourth apertures, 70, 72 and 74 respectively, will align between the first and second sides, 38 and 40.

When the second attachment member 76 is an elongated threaded bolt, the threads on the bolt can vary. One skilled in mechanical fasteners will be able to select a thread appropriate for this application. The second attachment member 76 is designed to pass through only one of the second, third and fourth apertures, 70, 72 and 74 respectively, at a time. The second attachment member 76 will pass through both of the first and second sides, 38 and 40 respectively. A flat washer 60, a lock washer 62 and a nut 64 can be secured to the free end of the second attachment member (threaded bolt) 76 once it has passed through both of the first and second sides, 38 and 40 respectively. A pin hole 66 is formed through the second attachment member (threaded bolt) 76 about 3 millimeters (mm) from its free end. The size of the pin hole 66 can vary. Desirably, the pin hole 66 has a diameter of less than about 0.2 inches. More desirably, the pin hole 66 has a diameter of less than about 0.15 inches. Even more desirably, the pin hole 66 has a diameter of about 0.1 inches. The pin hole 66 is designed to receive a cotter pin 68. The cotter pin 68 will ensure that the nut 64 will not come loose from the second attachment member (threaded bolt) 76.

It should be understood that the number and kinds of washers, the kinds of nuts, for example hex nuts, nyloc nuts, etc. can vary and one skilled in the art will understand what is best for a particular situation in order to obtain an adequate fastener.

Figure 7:
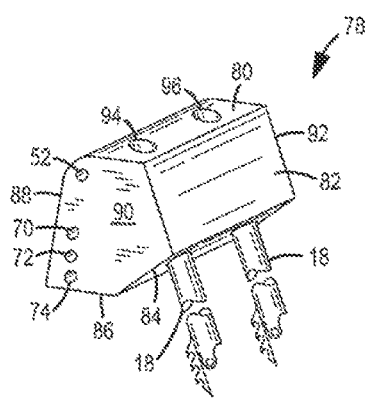
FIG. 7 is a perspective view of an inner housing.

Referring now to FIGS. 2 and 7, the variable housing and fork bracket assembly 28 also includes an inner housing 78. The inner housing 78 can be formed from a variety of material. Such materials include but are not limited to: steel, high carbon steel, metal, a metal alloy, titanium, a titanium alloy, polycarbonate or a strong composite material. The inner housing 78 can also be chrome plated, if desired. The inner housing 78 can vary in size, shape and configuration. The inner housing 78 engages with the outer housing 30. The inner housing 78 is depicted as a five sided structure having an upper surface 80, an upper front surface 82, a lower front surface 84, a lower surface 86 and a back surface 88. The inner housing 78 also has a pair of sides 90 and 92. The inner housing 78 is sized to easily slide into the generally C-shaped outer housing 30. The inner and outer housings, 78 and 30 respectively, can be sized so that a close or snug fit can be established. The inner housing 78 has to be able to move or pivot within the generally C-shaped outer housing 30 so one can insert the second attachment member 76 through the desired second, third or fourth apertures, 70, 72 and 74 respectively. For most applications, one does not want a great deal of slop or clearance between the inner and outer housing, 78 and 30 respectively.

The inner housing 78 also has a pair of angled apertures 94 and 96 formed therethrough. Desirably, the angled aperture 94 is aligned parallel to the angled aperture 96. The pair of angled apertures 94 and 96 can be angularly 10o aligned with respect to the outer housing 30 to provide the motorcycle 10 with a rake angle of between about 20° to about 45°. Desirably, the pair of angled apertures 94 and 96 can be angularly aligned with respect to the outer housing 30 to provide the motorcycle 10 with a rake angle of about 45°. The pair of angled apertures 94 and 96 is depicted as extending downward from the upper surface 80 through the lower front surface 84. The pair of angled apertures 94 and 96 can vary in diameter. Each of the angled apertures 94 and 96 should have an identical diameter. Each of the pair of angled apertures 94 and 96 can have a diameter ranging from between about 1.5 inches to about 3 inches. Desirably, each of the pair of angled apertures 94 and 96 has a diameter of from between about 1.75 inches to about 2.5 inches. More desirably, each of the pair of angled apertures 94 and 96 has a diameter of about 2 inches.

Referring to FIGS. 2, 3 and 7, the pair of angled apertures 94 and 96 can be spaced apart by any desired distance. For example, the pair of angled apertures 94 and 96 can be spaced apart by about 1 inch or more. Desirably, the pair of angled apertures 94 and 96 is spaced apart by about 2 inches or more. More desirably, the pair of angled apertures 94 and 96 is spaced apart by about 2.25 inches or more. The pair of angled apertures 94 and 96 is designed to receive and support the pair of forks 18, 18. The pair of angled apertures 94 and 96 will establish an initial rake angle for the motorcycle 10. The pair of angled apertures 94 and 96 are drilled or milled at a rake angle of say 30°. This means that the motorcycle 10 will have an initial rake angle of 30°. The rake angle is the slant or incline at which the pair of forks 18, 18 is aligned to the ground G. Each of the pair of angled apertures 94 and 96 can be spaced inward from one of the sides 90 and 92 by any desired distance. Each of the pair of angled apertures 94 and 96 can be spaced inward from one of the sides 90 and 92 by a distance of from between about 0.5 inches to about 3 inches depending on the overall width of the inner housing 78. Desirably, each of the pair of angled apertures 94 and 96 is spaced inward from one of the sides 90 and 92 by a distance of from between about 0.75 inches to about 2 inches. More desirably, each of the pair of angled apertures 94 and 96 is spaced inward from one of the sides 90 and 92 by a distance of about 1 inch.

Referring again to FIG. 6, the inner housing 78 also includes a first aperture 52 aligned with the first aperture 52 formed in the outer housing 30. When the first attachment member (threaded bolt) 58 passes through the first apertures 52, 52 formed in the inner and outer housing, 78 and 30 respectively, it creates a pivot connection. This means that the inner housing 78 can pivot relative to the outer housing 30 on the first attachment member 58. The inner housing 78 further includes at least two additional apertures, 70 and 72. Three additional apertures 70, 72 and 74 are shown which are hereinafter referred to as a second aperture 70, a third aperture 72 and a fourth aperture 74. It should be understood that one could form two, three, four, five, or more additional apertures in the inner housing 78 provided enough space was available. The number of additional apertures 70, 72 and 74 that are formed in the inner housing 78 should be equal to the number of additional apertures 70, 72 and 74 formed in the outer housing 30. The second, third and fourth apertures, 70, 72 and 74 respectively, are formed through the first and second sides, 90 and 92 respectively. All three additional apertures 70, 72 and 74 are aligned along the longitudinal central axis X-X of the outer housing 30. As the inner housing 78 pivots relative to the outer housing 30 on the first attachment member 58, one of the three additional apertures 70, 72 and 74 will coincide with the second, third and fourth apertures, 70, 72 and 74 respectively, formed in the outer housing 30. As depicted, the second aperture 70 is located to provide a 30° rake angle, the third aperture 72 is located to provide a 38° rake angle, and the fourth aperture 74 is located to provide a 34° rake angle.

Referring again to FIGS. 2 and 3, the second attachment member (threaded bolt) 76 passes through one of the additional apertures 70, 72 and 74 formed through both the outer housing 30 and the inner housing 78. Since our embodiment has three additional apertures 70, 72, and 74, the second attachment member (threaded bolt) 76 can pass through any one of these three additional apertures 70, 72 and 74. The second attachment member (threaded bolt) 76 secures the inner housing 78 to the outer housing 30 at a predetermined angle. This angle will provide the motorcycle 10 with a desired rake angle. The particular rake angles 30°, 38° or 34° are established by securing the second attachment member (threaded bolt) 76 through one of the second, third or fourth apertures, 70, 72 and 74 respectively, in cooperation with the angle at which the pair of angled apertures 94 and 96 are formed.

In FIG. 4, the inner housing 78 is secured to the outer housing 30 by securing the second attachment member (threaded bolt) 76 through the second aperture 70. This provides the motorcycle 10 with a 30° rake angle since the pair of angled apertures 94 and 96 were drilled or milled at 30°. In FIG. 2, the inner housing 78 is secured to the outer housing 30 by securing the second attachment member (threaded bolt) 76 through the fourth aperture 74. This provides the motorcycle 10 with a 34° rake angle. If the inner housing 78 is secured to the outer housing 30 by securing the second attachment member (threaded bolt) 76 through the third aperture 72, the motorcycle 10 would have a 38° rake angle.

Referring again to FIGS. 2 and 3, the pair of forks 18, 18 are capable of supporting an axle 22. The axle 22 has a front wheel 24 mounted thereon. In turn, a tire 26 is mounted to the wheel 24. Each of the pair of forks 18, 18 has a first end 98 and a second end 100, see FIG. 2. Each of the first ends 98, 98 passes through one of the pair of angled apertures 94 and 96 formed in the inner housing 78. A handlebar 20 is secured to the pair of brackets 21, 21 which are secured to the outer housing 30. The method of attaching or securing the handlebar 20 to the outer housing 30 can vary. Any method of attachment can be used which is known to those skilled in the art. For example, the handlebar (or pair of handlebars 20, 20) can be mechanically connected by a pair of brackets 21, 21 or be attached by some other known means. The angle at which the inner housing 78 is secured to the outer housing 30, in cooperation with the angle at which the pair of angled apertures 94 and 96 are formed, will establish the rake angle for the motorcycle 10. The second end 100 of each of the pair of forks 18, 18 terminates approximate the location of the axle 22.

Figure 8:
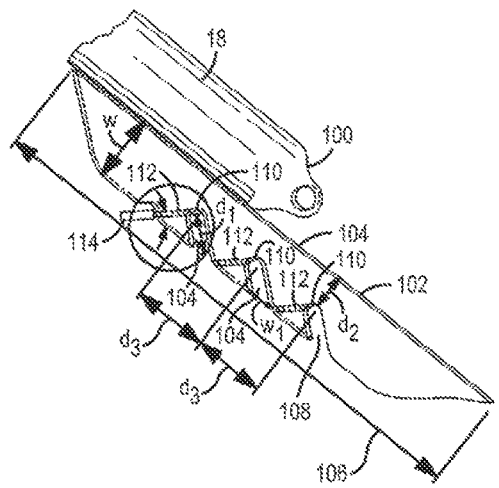
FIG. 8 is a side view of one of the pair of forks having a fork bracket secured thereto.
Figure 9:
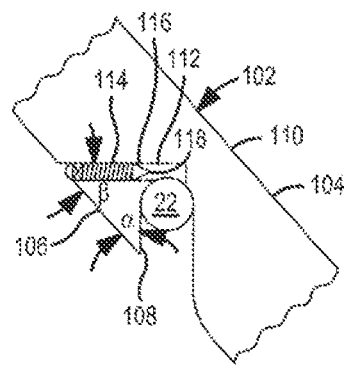
FIG. 9 is an enlarged view of a groove formed in one of the pair of fork brackets and a set screw intersecting with the groove which is used to make fine adjustments to the axle.

Referring now to FIGS. 8 and 9, the assembly 28 further includes a pair of brackets 102, 102. Each of the pair of brackets 102, 102 has an inner edge 104 and an outer edge 106. Each of the pair of brackets 102, 102 is secured via the inner edge 104 to one of the pair of forks 18, 18 at a location adjacent to the second end 100 of each fork 18. Each of the pair of bracket 102, 102 can be welded onto one of the pair of forks 18, 18 or be secured in some other known fashion. Each of the pair of brackets 102, 102 has at least two spaced apart grooves 108, 108 formed therein which open at the outer edge 106. Three grooves 108, 108 and 108 are depicted in FIG. 8. Each of the grooves 108, 108 and 108 can be formed at an angle alpha α relative to the outer edge 106. The angle α can vary. The angle α can range from between about 20° to about 60°. Desirably, the angle α can range from between about 25° to about 45°. More desirably, the angle α can range from between about 30° to about 40°.

Still referring to FIG. 8, three spaced apart grooves 108, 108 and 108 are depicted for receiving the axle 22. Each of the three spaced apart grooves 108, 108 and 108 corresponds to a specific trail (trail dimension) of the motorcycle 10. The axle 22 is designed to span across the pair of brackets 102, 102 and be positioned in one pair of horizontally aligned grooves 108, 108. The pair of grooves 108, 108, in which the axle 22 is positioned, will permit the axle 22 to be horizontally aligned, parallel to the longitudinal central axis X-X of the outer housing 30. The axle 22 should also be aligned horizontally to the ground G as well. One can adjust the trail (trail dimension) of the motorcycle 10 by positioning the axle 22 across the pair of brackets 102, 102 and into one of the pair of horizontally aligned spaced apart grooves 108, 108 and 108. As one selects a particular groove 108 in which to position the axle 22, one can adjust the trail (trail dimension) of the motorcycle 10. The trail (trail dimension) is directly related to the steering axis S-S of the motorcycle 10.

In the United States, laws governing the safe manufacturing of motorcycles 10 require motorcycle manufacturers to adhere to a set of minimum and maximum rake angles and trail dimensions. Such laws set the minimum and maximum rake angles to be from 20° to 45°. These rake angles correspond to trail dimensions of 2 inches and 14 inches, respectively. For a very stable ride, a motorcycle 10 should be designed to have a trail (trail dimension) ranging from about 2 inches to about 6 inches. Desirably, a motorcycle 10 should be designed to have a trail (trail dimension) ranging from about 3 inches to about 5 inches. A motorcycle 10 having a small trail dimension will experience less wobble at various speeds and therefore will provide a more stable ride.

Referring now to FIGS. 8 and 9, the number of spaced apart grooves 108, 108 and 108 will correspond to the number of additional apertures 70, 72, 74, etc., formed in the inner and outer housings, 78 and 30 respectively. Since our embodiment has three apertures, 70, 72 and 74 respectively, formed in each of the inner and outer housings, 78 and 30 respectively, each of the pair of brackets 102, 102 will also have three spaced apart grooves 108, 108 and 108. When the axle 22 is positioned in the lower groove 108, the motorcycle 10 will have a 30° rake angle. When the axle 22 is positioned in the middle groove 108, the motorcycle 10 will have a 34° rake angle. When the axle 22 is positioned in the upper groove 108, the motorcycle 10 will have a 38° rake angle.

If only two grooves 108, 108 are utilized, they can be spaced at any desired distance from one another. If three or more grooves 108, 108 and 108 are utilized they can be spaced an equal distance apart from one another or be spaced an unequal distance apart from one another. The exact location of each groove 108, 108 and 108 will correspond to a particular rake angle for a given motorcycle 10.

Referring again to FIG. 8, each of the pair of brackets 102, 102 has a length l which can vary. Desirably, each of the brackets 102, 102 has the same length l although this is not required. The length l of each of the brackets 102, 102 can range from between about 6 inches to about 16 inches. Desirably, the length l of each of the brackets 102, 102 can range from between about 8 inches to about 14 inches. More desirably, the length l of each of the brackets 102, 102 can range from between about 9 inches to about 12 inches. Even more desirably, the length l of each of the brackets 102, 102 is about 10 inches.

Still referring to FIG. 8, each of the brackets 102, 102 has a width w which can vary. Desirably, each of the brackets 102, 102 has the same width w although this is not required. The width w of each of the brackets 102, 102 can range from between about 1 inch to about 3 inches. Desirably, the width w of each of the brackets 102, 102 can range from between about 1.25 inches to about 2.5 inches. More desirably, the width w of each of the brackets 102, 102 can range from between about 1.5 inches to about 2.25 inches. Even more desirably, the width w of each of the brackets 102, 102 is about 2 inches.

Figure 10:
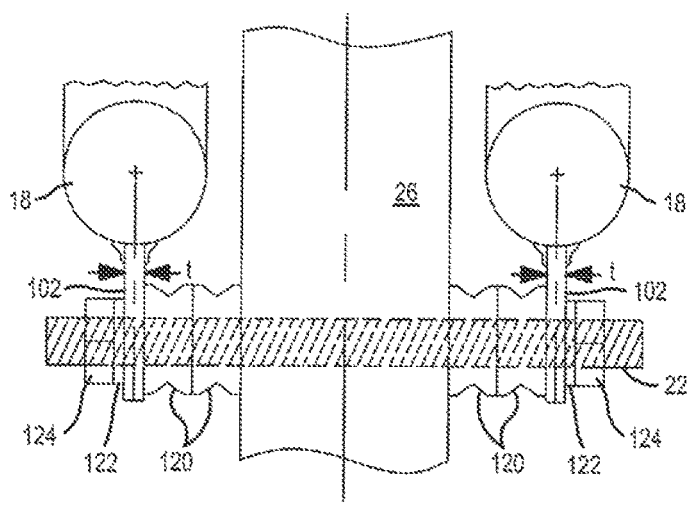
FIG. 10 is a cross-sectional view of FIG. 2 taken along line 10-10 showing an axle secured to the pair of fork brackets.

Referring to FIG. 10, each of the brackets 102, 102 has a thickness t which can vary. Desirably, each of the brackets 102, 102 has the same thickness t although this is not required. The thickness t of each of the brackets 102, 102 can range from between about 0.25 inches to about 0.75 inches. Desirably, the thickness t of each of the brackets 102, 102 can range from between about 0.3 inches to about 0.7 inches. More desirably, the thickness t of each of the brackets 102, 102 can range from between about 0.5 inches to about 0.65 inches. Even more desirably, the thickness t of each of the brackets 102, 102 is about 0.6 inches.

Referring again to FIG. 8, each of the three grooves 108, 108 and 108 has a width $w_1$ and a depth $d_1$. The width $w_1$ and a depth $d_1$ of each of the three grooves 108, 108 and 108 can vary. A width $w_1$ of about 0.6 inches or larger and a depth $d_1$ of about 0.75 inches works well. Desirably, each of the three grooves 108, 108 and 108 has a width $w_1$ of about 0.75 inches or larger and a depth $d_1$ of about 1 inch or larger.

Still referring to FIG. 8, each of the three grooves 108, 108 and 108 has an inner surface 110. The inner surface 110 is spaced a distance $d_2$ away from the inner edge 104. The distance $d_2$ can vary. Normally, the distance $d_2$ ranges from between about 0.75 inches to about 1.5 inches. Desirably, the distance $d_2$ is about 1 inch.

Each of the three grooves 108, 108 and 108 is separated from one another by a distance $d_3$. The distance $d_3$ is aligned parallel to the length l of each of the pair of brackets 102, 102. The distance $d_3$ between adjacent grooves 108, 108 can vary. The distance $d_3$ between two adjacent grooves 108, 108 can range from between about 2 inches to about 4 inches. Desirably, the distance $d_3$ between two adjacent grooves 108, 108 can range from between about 2.5 inches to about 3.5 inches. More desirably, the distance $d_3$ between two adjacent grooves 108, 108 can range from between about 2.75 inches to about 3.25 inches. Even more desirably, the distance $d_3$ between two adjacent grooves 108, 108 can be about 3 inches.

Referring again to FIGS. 8 and 9, the variable housing and fork bracket assembly 28 further includes three threaded apertures 112, 112 and 112, each of which intersects with one of the three grooves 108, 108 and 108 formed in each of the pair of brackets 102, 102. Desirably, each threaded aperture 112 intersects the inner surface 110 of each groove 108. Each threaded aperture 112 is aligned at an angle beta β to the outer edge 106 of each of the pair of brackets 102, 102. The angle beta β can vary in degrees. The angle beta β can range from between about 20° to about 60°. Desirably, the angle beta β is at about 45°.

Each of the threaded apertures 112, 112 and 112 can vary in diameter. Typically, the diameter of each of the threaded apertures 112, 112 and 112 ranges from between about 0.2 inches to about 0.4 inches. A diameter of about 0.25 inches works well for each of the threaded apertures 112, 112 and 112. A set screw 114 is positioned in each of the threaded apertures 112, 112 and 112. By "set screw" it is meant a screw, often without a head, used to provide a fine adjustment or used to regulate the tension of a spring. Each set screw 114 is movable by screwing it into or out of the respective threaded aperture 112.

Referring to FIG. 9, each of the three set screws 114, 114 and 114 has a contact surface 116 which terminates into a point 118. The contact surface 116 can be linear or arcuate. A linear shape would produce a tapered contact surface on the set screw 114 while an arcuate shape would produce a conical contact surface on the set screw 114. The contact surface 116 is designed to contact a portion of the periphery of the axle 22, when the axle 22 is positioned across the pair of brackets 102, 102, and is located in one of the three grooves 108, 108 and 108. By screwing the set screw 114 into the threaded aperture 112, the contact surface 116 will contact a portion of the periphery of the axle 22 and urge it away from the bottom or inner surface 110 of the groove 108 ever so slightly. This physical contact with a portion of the outer periphery of the axle 22 by the contact surface 116 is used to make fine adjustments to the alignment of the axle 22. By aligning the axle 22, one can be certain that the wheel 24 will be properly aligned relative to the motorcycle 10. In addition, when the wheel 24 is properly aligned, the tire 26 will not rub against one of the pair of forks 18, 18.

It should be understood that each of the set screws 114, 114 and 114 can vary in design and construction. The set screw 114 can include a spring (not shown), if desired. Those skilled in the art are well aware of spring biased set screws.

Referring now to FIG. 10, the axle 22 is shown mounted across the pair of brackets 102, 102. One or more spacers 120 are shown being positioned in between the pair of brackets 102, 102. In addition, a washer 122 and a nut 124 are secured to each end of the axle 22, on the outside of the pair of brackets 102, 102. By threading the nuts 124, 124 onto the axle 22, one can secure the axle 22 to the pair of brackets 102, 102.

Figure 12:
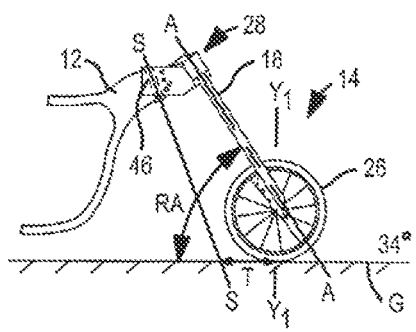
FIG. 12 is a side view of the front of a motorcycle showing rake angle of 34° and an intermediate trail dimension.
Figure 13:
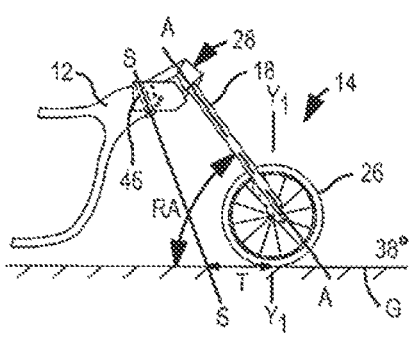
FIG. 13 is a side view of the front of a motorcycle showing rake angle of 38° and a larger trail dimension.

Referring now to FIGS. 11-13, one can see that the pair of forks 18, 18 of the motorcycle 10 is aligned along an axis A-A. The axis A-A intersects the ground G at a slant or incline and creates an angle RA. This angle RA is referred to as the "rake angle" of the motorcycle 10. A vertical axis $Y_1$-$Y_1$ passes through the center of the axle 22, the front wheel 24 and tire 26. The vertical axis $Y_1$-$Y_1$ perpendicularly intersects the ground G. A steering axis S-S is also depicted that passes through the steering post 46 that secures the assembly 28 to the frame 12 of the motorcycle 10. The steering axis S-S intersects the ground G at a slant or incline and at a location rearward of the vertical axis $Y_1$-$Y_1$. The horizontal distance between the point where the vertical axis $Y_1$-$Y_1$ and the steering axis S-S intersect the ground G is referred to as the trail T. The term "trail" is used because the point of intersection of the steering axis S-S with the ground G is rearward or trails the point where the vertical axis $Y_1$-$Y_1$ intersects the ground G.

In FIGS. 11-13, one can clearly see that the trail T changes as the angle of the steering axis S-S changes. It is important to keep the trail "T" dimension small in order to stabilize the ride of the motorcycle 10. The trail "T" dimension should be less than about 14 inches. Desirably, the trail "T" dimension will range from between about 2 inches to 6 inches. More desirably, the trail "T" dimension will range from between about 3 inches to about 6 inches. Even more desirably, the trail "T" dimension is less than about 5 inches. Most desirably, the trail "T" dimension is less than about 4 inches.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:
1. An assembly for adjusting rake angle and trail on a motorcycle, comprising:
  a) an outer housing having a longitudinal central axis and a vertical central axis, said outer housing having first and second sides aligned parallel to said vertical central axis, attachment means for pivotably securing said outer housing to a motorcycle frame, a first aperture, and at least three additional apertures aligned parallel to said longitudinal central axis and formed through said first and second sides;
b) an inner housing engaging said outer housing, said inner housing having a pair of angled apertures formed therethrough, a first aperture aligned with said first aperture formed in said outer housing, and at least three additional apertures each of which is capable of being aligned with one of said at least three additional apertures formed in said outer housing;
c) a first attachment member passing through said first apertures formed through said outer and inner housings for securing said inner housing to said outer housing;
d) a second attachment member passing through one of said at least three additional apertures formed through said outer and inner housings for securing said inner housing at a predetermined angle to said outer housing;
e) a pair of forks capable of supporting an axle on which a front wheel is mounted, each of said pair of forks having a first end and a second end, each of said first ends passing through one of said pair of angled apertures formed in said inner housing, and said pair of angled apertures establishing a rake angle and a trail for said motorcycle; and
f) a pair of brackets, each secured adjacent to said second end of each of said pair of forks, each of said pair of brackets having at least three spaced apart grooves formed therein for receiving said axle, whereby one can adjust said rake angle and trail of said motorcycle by adjusting the position of said inner housing to said outer housing and by positioning said axle across said pair of brackets using different pairs of said spaced apart grooves.

2. The assembly of claim 1 wherein each of said pair of brackets has three spaced apart grooves formed therein.

3. The assembly of claim 2 wherein each of said three spaced apart grooves is spaced an equal distance from an adjacent groove.

4. The assembly of claim 2 wherein each of said three spaced apart grooves is spaced an unequal distance from one another.

5. The assembly of claim 2 wherein each of said three spaced apart grooves is intersected by a threaded aperture and a set screw is positioned in each of said threaded apertures, and each of said set screws can contact said axle, when present, to provide an adjustment for aligning said wheel.

6. The assembly of claim 1 wherein said at least three additional apertures include three additional apertures formed therethrough, each of said three additional apertures corresponding with a rake angle of 30°, 38° or 34°.

7. The assembly of claim 1 wherein said pair of angled apertures formed in said inner housing can be angularly aligned with respect to said outer housing to provide said motorcycle with a rake angle of from between about 20 degrees to about 45 degrees.

8. The assembly of claim 7 wherein said pair of angled apertures formed in said inner housing can be angularly aligned with respect to said outer housing to provide said motorcycle with a rake angle of about 45 degrees.

9. The assembly of claim 1 wherein said inner and said outer housings are constructed from high carbon steel.

10. An assembly for adjusting rake angle and trail on a motorcycle, comprising:
a) an outer housing having a longitudinal central axis, a vertical central axis and a transverse central axis, said outer housing having first and second sides aligned parallel to said vertical central axis, an attachment means for pivotably securing said outer housing to a motorcycle frame, a first aperture aligned along said longitudinal central axis, and at least three additional apertures aligned parallel to said longitudinal central axis and formed through said first and second sides;
b) an inner housing engaging said outer housing, said inner housing having a pair of angled apertures formed therethrough, a first aperture aligned with said first aperture formed in said outer housing, and at least three additional apertures each of which is capable of being aligned with one of said at least three additional apertures formed in said outer housing;
c) a first attachment member passing through said first apertures formed through said outer and inner housings for securing said inner housing to said outer housing;
d) a second attachment member passing through one of said at least three additional apertures formed through said outer and inner housings for securing said inner housing at a predetermined angle to said outer housing;
e) a pair of forks capable of supporting an axle on which a front wheel is mounted, each of said pair of forks having a first end and a second end, each of said first ends passing through one of said pair of angled apertures formed in said inner housing, and said pair of angled apertures establishing a rake angle and a trail for said motorcycle; and
f) a pair of brackets, each secured adjacent to said second end of each of said pair of forks, each of said pair of brackets having at least two spaced apart grooves formed therein for receiving said axle, whereby one can adjust said rake angle and trail of said motorcycle by adjusting the position of said inner housing to said outer housing and by positioning said axle across said pair of brackets using different pairs of said spaced apart grooves.

11. The assembly of claim 10 wherein each of said pair of brackets has three spaced apart grooves formed therein, and said axle can be positioned within a pair of any of said three spaced apart grooves to provide a trail of from between about 2 inches to about 6 inches.

12. The assembly of claim 11 wherein each of said three spaced apart grooves is intersected by a threaded aperture, a set screw is positioned in each of said threaded apertures, and each of said set screws can contact said axle, when present, to provide an adjustment for aligning said wheel.

13. The assembly of claim 11 wherein said axle can be positioned across said pair of brackets and be positioned in a pair of any of said three spaced apart grooves to provide a trail of from between about 3 inches to about 5 inches.

14. The assembly of claim 10 wherein said inner and said outer housings are constructed from a metal or a metal alloy.

15. The assembly of claim 14 wherein said inner and said outer housings are constructed from titanium or a titanium alloy.

16. An assembly for adjusting rake angle and trail on a motorcycle, comprising:
a) an outer housing having a longitudinal central axis and a vertical central axis, said outer housing having first and second sides aligned parallel to said vertical central axis, an enlarged aperture formed therethrough which is sized to receive a post secured to a motorcycle frame, a first aperture and at least three additional apertures aligned parallel to said longitudinal central axis;
b) an inner housing engaging said outer housing, said inner housing having a pair of angled apertures formed therethrough, a first aperture aligned with said first aperture formed in said outer housing, and at least three additional apertures each of which is capable of being aligned with one of said at least three additional apertures formed in said outer housing;

c) a first attachment member passing through said first apertures formed through said outer and inner housings for securing said inner housing to said outer housing;

d) a second attachment member passing through one of said at least three additional apertures formed through said outer and inner housings for securing said inner housing at a predetermined angle to said outer housing;

e) a pair of forks capable of supporting an axle on which a front wheel is mounted, each of said pair of forks having a first end and a second end, each of said first ends passing through one of said pair of angled apertures formed in said inner housing, and said pair of angled apertures establishing a rake angle and a trail for said motorcycle; and f) a pair of brackets, each secured adjacent to said second end of each of said pair of forks, each of said pair of brackets having at least two spaced apart grooves formed therein for receiving said axle, whereby one can adjust said rake angle and trail of said motorcycle by adjusting the position of said inner housing to said outer housing and by positioning said axle across said pair of brackets using different pairs of said spaced apart grooves.

17. The assembly of claim 16 wherein said at least three additional apertures include three additional apertures formed therethrough, each additional aperture corresponding with a specific rake angle.

18. The assembly of claim 16 wherein said at least two spaced apart grooves include three spaced apart grooves, each groove corresponding to a specific trail.

19. The assembly of claim 16 wherein each of said pair of brackets has three spaced apart grooves formed therein, and each of said three spaced apart grooves is spaced at an equal distance apart from an adjacent groove.

20. The assembly of claim 16 wherein said inner and said outer housings are constructed from polycarbonate.

* * * * *